United States Patent
Claussen et al.

(10) Patent No.: US 7,461,075 B2
(45) Date of Patent: Dec. 2, 2008

(54) METHOD FOR UPDATING XML SCHEMA REGISTRY USING SCHEMA PASS BY VALUE WITH MESSAGE

(75) Inventors: Christopher Shane Claussen, Austin, TX (US); Zeenat Kulkarni, San Mateo, CA (US); Yang Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/134,494

(22) Filed: May 20, 2005

(65) Prior Publication Data

US 2006/0265716 A1    Nov. 23, 2006

(51) Int. Cl.
*G06F 7/00* (2006.01)
(52) U.S. Cl. .................. 707/101; 707/103 R
(58) Field of Classification Search .............. 707/101, 707/103 R; 715/212
See application file for complete search history.

(56) References Cited

U.S. PATENT DOCUMENTS

| | | | |
|---|---|---|---|
| 6,832,219 B2 | 12/2004 | Lal | 707/3 |
| 2004/0172592 A1* | 9/2004 | Collie et al. | 715/503 |
| 2004/0220946 A1* | 11/2004 | Krishnaprasad et al. | 707/100 |
| 2004/0244012 A1* | 12/2004 | Massarenti | 719/319 |
| 2005/0273703 A1* | 12/2005 | Doughan | 715/513 |
| 2006/0101423 A1* | 5/2006 | Aharoni et al. | 717/136 |
| 2006/0173868 A1* | 8/2006 | Angele et al. | 707/100 |

* cited by examiner

*Primary Examiner*—John Cottingham
*Assistant Examiner*—Alexandria Y Bromell
(74) *Attorney, Agent, or Firm*—Duke W. Yee; Prentiss W. Johnson; Peter B. Manzo

(57) ABSTRACT

Schema information is provided with transmission of a data object. When a data object is converted to a transmission format, schema information for the object type is added to the transmission format element. The unmarshaling code uses the schema information to update a schema registry at the receiving end. The schema registry is used as a tool for converting the transmission format element back to the data element. The next time an object of that object type is sent to the recipient, the schema information is not added to the transmission format element.

8 Claims, 5 Drawing Sheets

METHOD FOR UPDATING XML SCHEMA REGISTRY USING SCHEMA PASS BY VALUE WITH MESSAGE

BACKGROUND OF THE INVENTION

1. Field of the Invention

The present invention relates generally to transmission of data objects and, more particularly, to marshalling and unmarshalling extensible markup language schemas to a business object model framework.

2. Description of the Related Art

Developers use frameworks for application development. These frameworks typically include an architecture and an application programming interface (API). Java™ 2 Platform, Enterprise Edition (J2EE) is an example framework from Sun Microsystems for building distributed enterprise applications. J2EE™ services are performed in a middle tier between a user's machine and the enterprise's databases and legacy information systems.

When a data object in an application framework is transmitted from a sending device to a receiving device, the object is typically converted into a transmission format. The transmission format may be in a binary format or a text format. However, converting a data object from one format to another, and then reconverting the information back to the original format, can be a difficult task. The sending code must include instructions for converting the data object to the transmission format, and the receiving code must include instructions for rebuilding the object.

Currently, when a developer is writing code for sending and/or receiving a data object, the developer must re-invent the code for converting to and from the transmission format based on the specific type and structure of the data object. More specifically, the receiving code will expect certain object types and structures. If the receiving code receives a new object type, the receiving code will not know how to rebuild the data object.

SUMMARY OF THE INVENTION

The present invention provides schema information with transmission of a data object. When a data object is converted to a transmission format, schema information for the object type is added to the transmission format element. The unmarshaling code uses the schema information to update a schema registry at the receiving end. The schema registry is used as a tool for converting the transmission format element back to the data element. The next time an object of that object type is sent to the recipient, the schema information is not added to the transmission format element.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
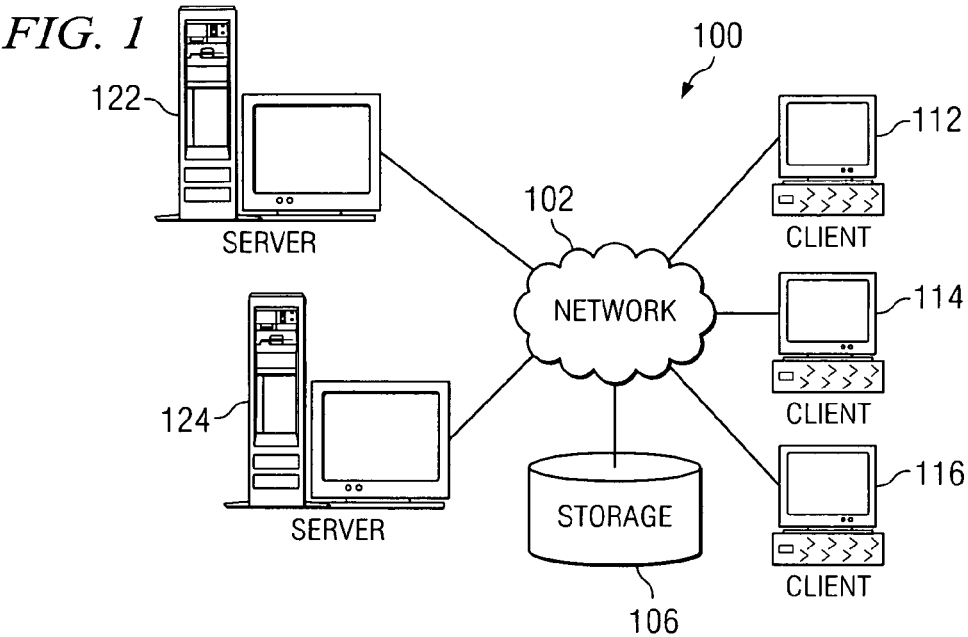
FIG. 1 depicts a pictorial representation of a network of data processing systems in which aspects of the present invention may be implemented.
Figure 2:
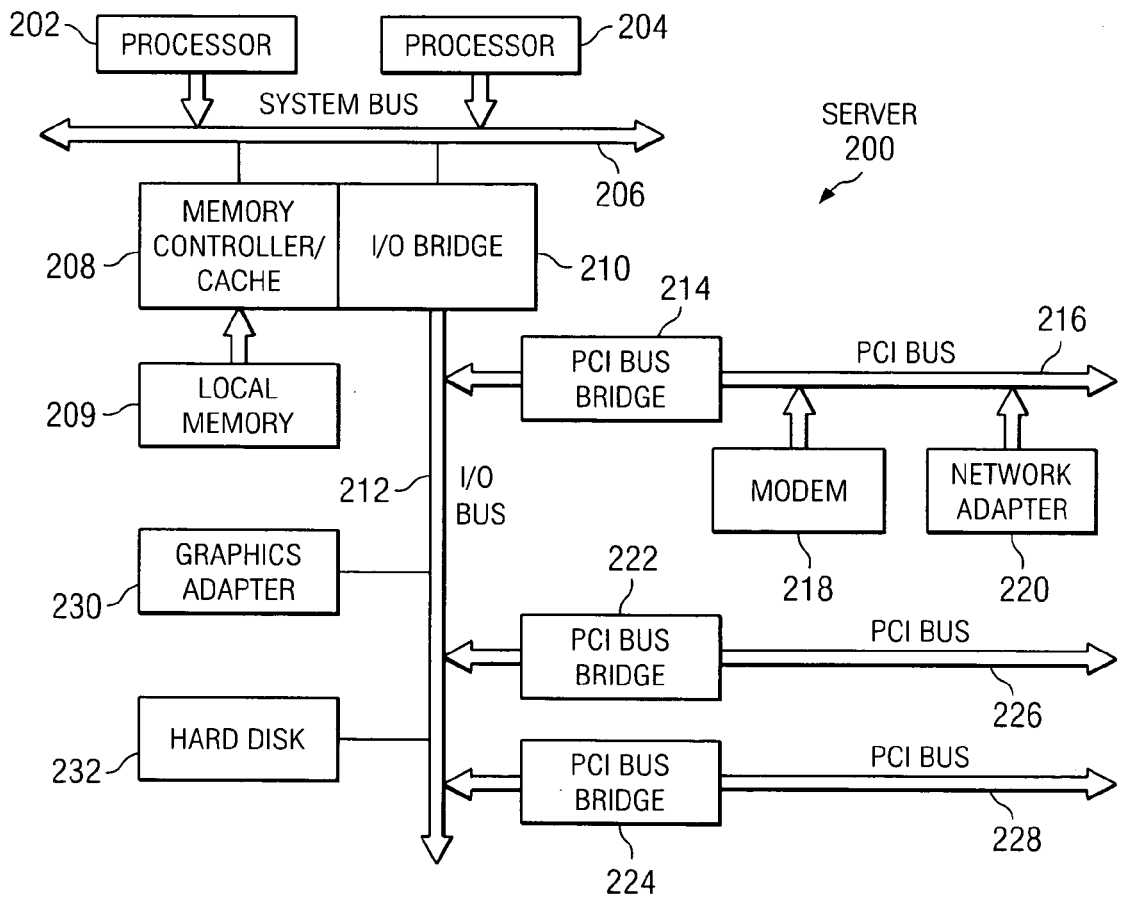
FIG. 2 is a block diagram of a data processing system that may be implemented as a server in accordance with an illustrative embodiment of the present invention.
Figure 3:
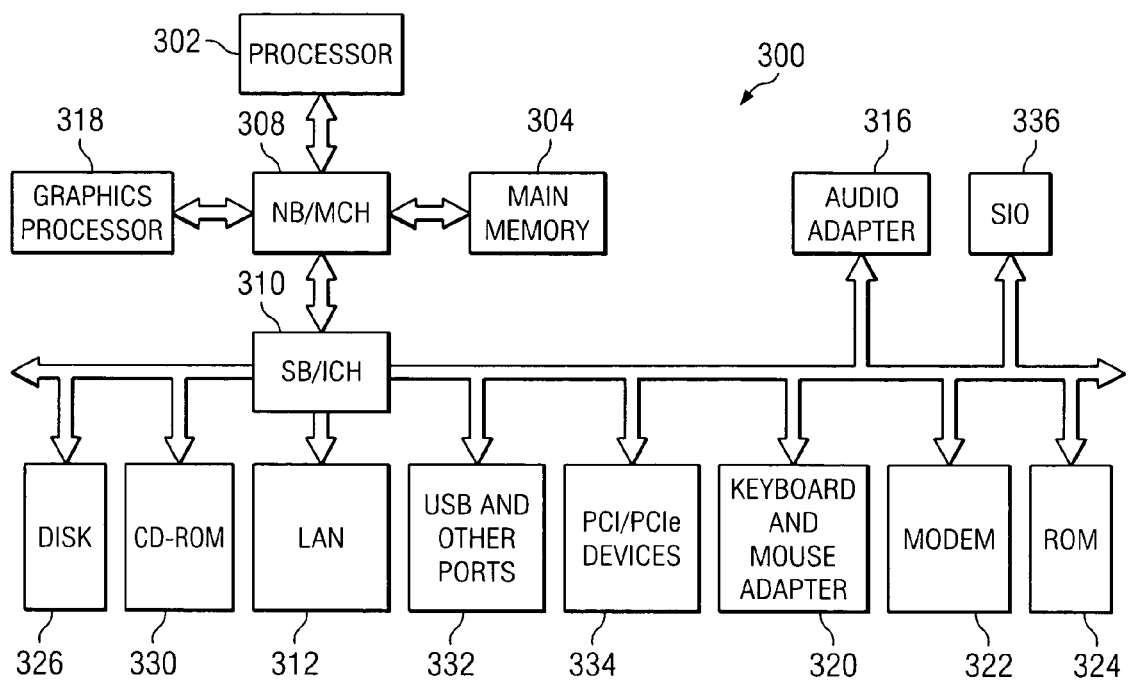
FIG. 3 is a block diagram of a data processing system in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 122, 124 connect to network 102 along with storage unit 106. In addition, clients 112, 114, 116 connect to network 102. These clients 112, 114, 116 may be, for example, personal computers or network computers. In the depicted example, server 122, for instance, may provide data, such as boot files, operating system images, and applications to clients 112, 114, 116. Clients 112, 114, 116 are clients to server 122 in the example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 112, 114, 116 in FIG. 1 or other servers may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pseries, and AIX are trademarks of International Business Machines Corporation in the United States, other countries, or both, while Linux is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which code or instructions implementing the processes for embodiments of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, memory 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the buss system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

Returning to FIG. 1, clients 112, 114, 116 and server 122, 124 may implement a Java programming environment, such as the J2EE™ platform. More specifically, in an exemplary embodiment, clients 112, 114, 116 and server 122, 124 may implement a service data object (SDO) framework, which includes an architecture and an application programming interface (API). SDO simplifies the J2EE™ data programming model and incorporates J2EE™ patterns and best practices. SDO also abstracts data in a service-oriented architecture, unifies data application development, and supports and integrates extensible markup language (XML).

XML is becoming ubiquitous in distributed applications. XML schema may be used to define business rules in an application's data format. XML itself may be used to facilitate interaction. For this reason, XML is often used as the transmission format for transmitting data objects from one application to another.

SDO clients use the SDO framework to work with data. Instead of using technology-specific APIs and frameworks, the SDO clients use the SDO programming model and API. SDO clients work on SDO data graphs and do not need to know how the data they are working with is persisted or serialized.

Data objects are the fundamental component of SDO, as represented in the name of the Service Data Objects framework specification itself. Data objects are the representation of structured data. SDO data objects are generic and provide a common view of structured data built by a data management system. While a Java Database Connectivity (JDBC™) data management system, for instance, needs to know about the persistence technology and how to configure and access it, a SDO client need not know anything about the specific technology. SDO data objects hold their "data" in properties and provide convenient creation and deletion methods and reflective methods to get their types. SDO data objects are linked together and contained in data graphs. Data graphs provide a container for a tree of SDO data objects.

In accordance with exemplary aspects of the present invention, the sending code marshals, or serializes, the data object as XML into XML schema. The sending code adds XML schema information for the data object. The receiving code then extracts the XML schema information in the XML and uses this schema information to build the data object on the receiving end.

Figure 4:
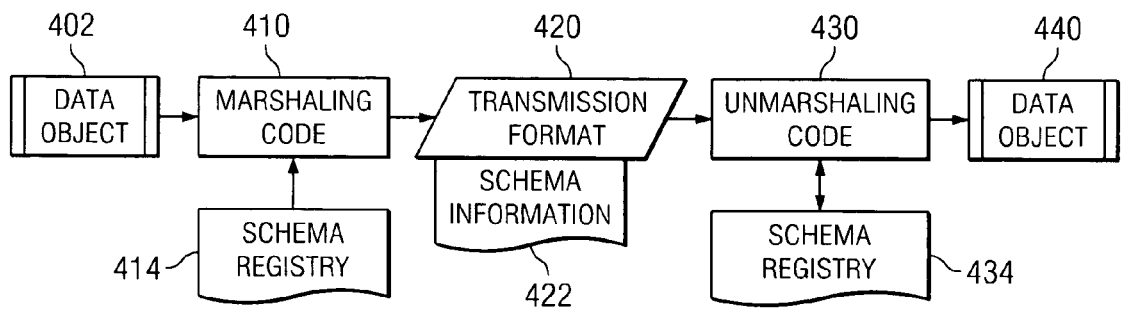
FIG. 4 is a diagram illustrating marshaling and unmarshaling of a data object in accordance with exemplary aspects of the present invention.

With reference to FIG. 4, a diagram illustrating marshaling and unmarshaling of a data object is shown in accordance with exemplary aspects of the present invention. Data object 402 is serialized by marshaling code 410 into transmission format 420. Data object 402 may be, for example, a SDO data object, a J2EE™ data object, or a data object in any other application programming framework. Marshaling code 410 may be, for example, a SDO API; however, marshaling code 410 may be any code that transmits data object 402 over a network, software, or other communication channel. Also, transmission format 420 may be XML, although other transmission formats may be used depending upon the implementation, such as other text formats or binary format.

When marshaling code 410 serializes data object 402, schema registry 414 may be consulted to determine the schema for serializing the data object. Marshaling code 410 also adds the schema information 422 for the object type to transmission format 420. The next time an object of that type is sent to the recipient, the schema information need not be added.

Unmarshaling code 430 at the receiving end receives transmission format 420 with the schema information 422. Unmarshaling code 430 may then add the schema information to schema repository 434. In this way, unmarshaling code 430 builds the schema repository 434 as data objects are received. Unmarshaling code 430 may then use the schema information 422 or schema information in repository 434 to deserialize transmission format 420 to form data object 440.

Thus, unmarshaling code 430 at the receiving end need not know ahead of time the specific schema used to serialize the data object.

Figure 5:
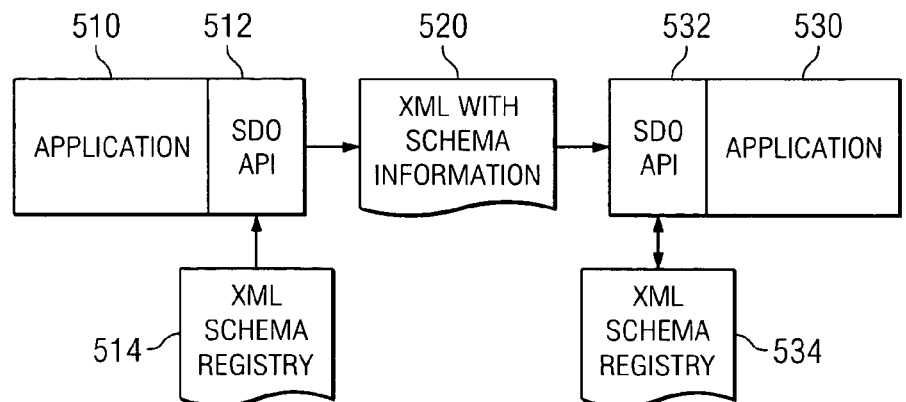
FIG. 5 is a diagram illustrating marshaling and unmarshaling XML schema to SDO data objects in accordance with exemplary aspects of the present invention.

FIG. 5 is a diagram illustrating marshaling and unmarshaling XML schemas to SDO data objects in accordance with exemplary aspects of the present invention. Applications 510 and 530 operate within the SDO application development framework. A SDO client may access a data object through SDO API 512. For example, application 530 may request a SDO data object from application 510. SDO API 512 then marshals the data object into XML with XML schema 520. SDO API 522 unmarshals XML 520 into the SDO data object for use by application 530.

When application 510 sends a SDO data object to application 530, SDO API 512 determines whether it is the first time a data object of that object type has been sent to application 530. If it is the first time, SDO API 512 adds the XML schema information to the XML. If it is not the first time the object type has been sent to application 530, then SDO API 512 may not add the type information to XML 520.

Figure 6:
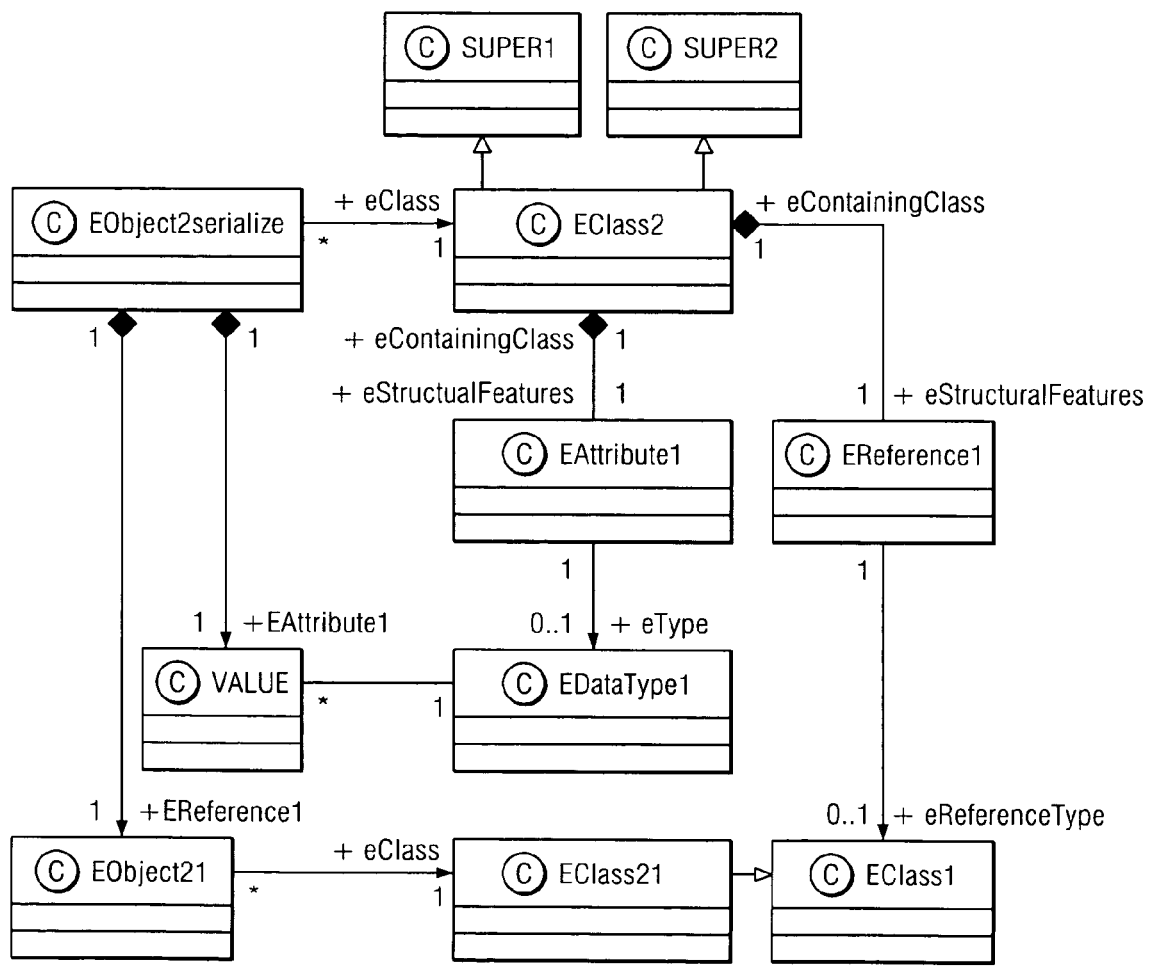
FIG. 6 illustrates an example objects graph with corresponding schema in accordance with exemplary aspects of the present invention.

The XML schema for a data object may include schema information for that object type; however, the schema may also include further schema information. FIG. 6 illustrates an example objects graph with corresponding schema in accordance with exemplary aspects of the present invention. In this example, EObject2serialize is of the type EClass2. Also, EObject2serialize contains EObject21. Eobject21 is of the type EClass21. Therefore, when adding the schema information, the marshaling code will not only serialize EClass2, but will also serialize EClass21.

In addition, a schema may extend from super schemas, such as Super1 and Super2, and may contain properties, whose types are also schema. Therefore, when serializing EClass2, the marshaling code may also serialize Super1 and Super2. Furthermore, EClass2 has properties of EAttribute1 and EReference1. EAttribute1 is of type EDataType1 and EReference1 is of type EClass1.

Thus, the marshaling code may serialize the schema for super schemas and also for object properties. However, when a schema has already been sent with a previous data object, the marshaling code need not serialize the schema. For example, if a first object and a second object belong to the same super schema, the super schema may be sent only once with the first object, but the schema for the object type of the second object may be sent with the second object without the super schema.

Figure 7:
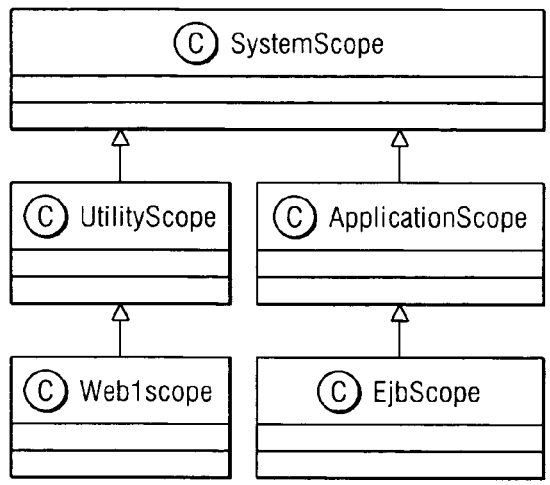
FIG. 7 illustrates an example of scoping for schema of data objects in accordance with exemplary aspects of the present invention.

The marshaling code may also serialize the scope of a schema. FIG. 7 illustrates an example of scoping for schema of data objects in accordance with exemplary aspects of the present invention. During schema deserialization, the unmarshaling code updates the schema registry according to the scopes. If the scoping on the deserialization end is different from the serialization end, the unmarshaling code tries to map the scoping from the bottom up.

An overall registry may be composed of several registries, each corresponding to a scope. The registries are organized in a hierarchy, as defined by the scoping. As shown in FIG. 7, the registry is composed of SystemScope, UtilityScope, Web1scope, ApplicationScope, and EjbScope.

UtilityScope and ApplicationScope are children of SystemScope. Schemas within SystemScope are visible, or available to, UtilityScope and ApplicationScope. Similarly, Web1scope is a child of UtilityScope. When in Web1scope, the schemas in UtilityScope and SystemScope are visible. EjbScope is a child of ApplicationScope and schemas in ApplicationScope and SystemScope are visible to EjbScope. However, schemas in Web1scope are not available to EjbScope.

Figure 8:
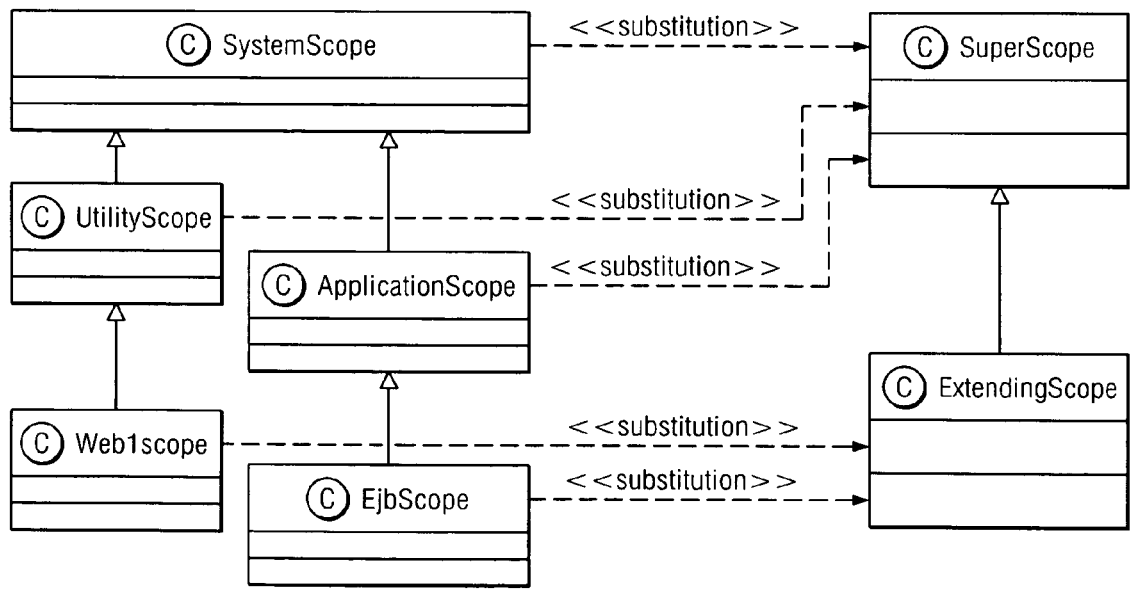
FIG. 8 illustrates an example of mapping of scoping in accordance with exemplary aspects of the present invention.

FIG. 8 illustrates an example of mapping of scoping in accordance with exemplary aspects of the present invention. The sending application and the receiving application may have different scoping. As shown in FIG. 8, the sending end may have scoping including SystemScope, UtilityScope, Web1scope, ApplicationScope, and EjbScope, while the receiving end may have scoping including SuperScope and ExtendingScope. When a schema is sent from the sending application to the receiving application, the schema must be placed in the appropriate scope.

In the depicted example, SystemScope, UtilityScope, and ApplicationScope are mapped to SuperScope on the receiving end. Also, as depicted in the example shown in FIG. 8, Web1scope and EjbScope are mapped to ExtendingScope. As an example, if a schema from UtilityScope is sent from the sending application to the receiving application, the schema is placed in SuperScope. As a further example, if a schema from EjbScope is sent from the sending application to the receiving application, the schema is placed in ExtendingScope.

Figure 9:
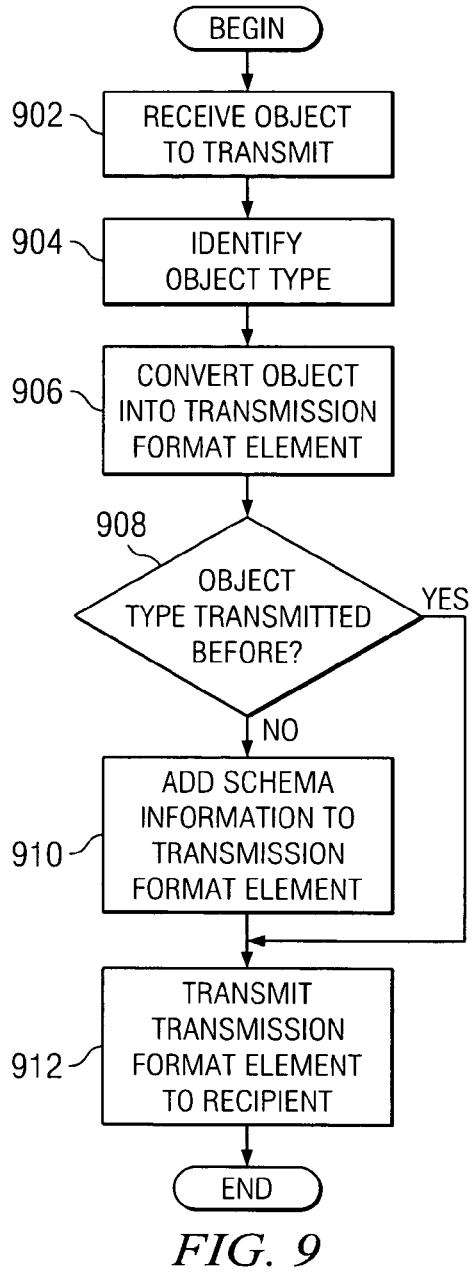
FIG. 9 is a flowchart illustrating operation of marshaling a data object into a transmission format in accordance with exemplary aspects of the present invention.

FIG. 9 is a flowchart illustrating operation of marshaling a data object into a transmission format in accordance with exemplary aspects of the present invention. Operation begins and the marshaling code receives an object to be transmitted (block 902). The marshaling code then identifies the object type (block 904) and converts the object into a transmission format element for transmission (block 906).

Next, the marshaling code determines whether the object type has been transmitted before (block 908). If the object type has not been transmitted before, the marshaling code adds schema information to the transmission format element (block 910). Thereafter, the marshaling code transmits the transmission format element to the recipient (block 912) and operation ends. If the object type has been transmitted before, operation proceeds directly to block 912 to transmit the transmission format element to the recipient.

Figure 10:
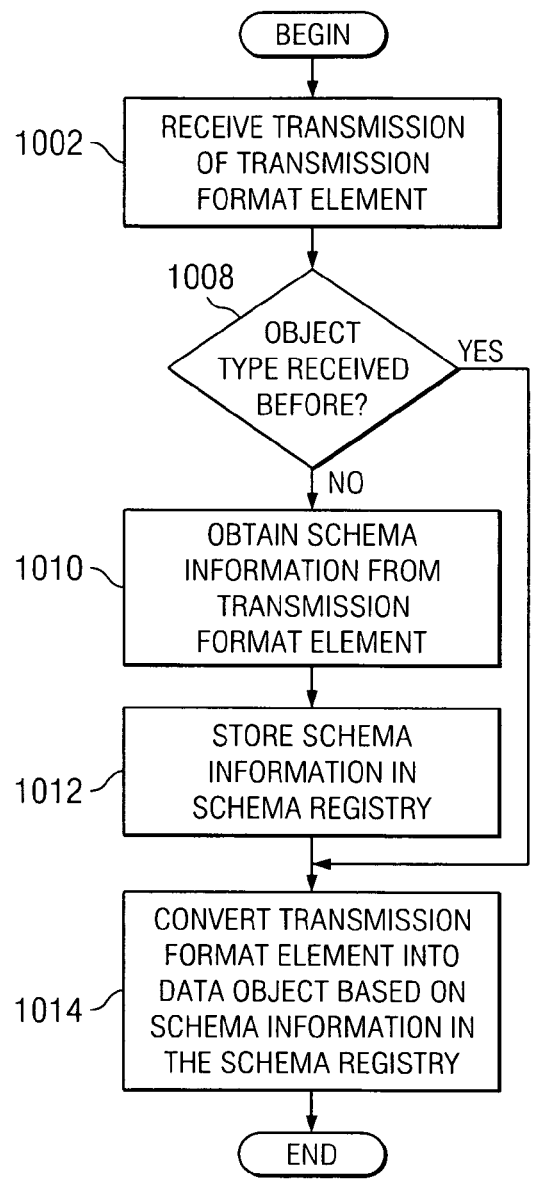
FIG. 10 is a flowchart illustrating operation of unmarshaling a data object from a transmission format in accordance with exemplary aspects of the present invention.

FIG. 10 is a flowchart illustrating operation of unmarshaling a data object from a transmission format in accordance with exemplary aspects of the present invention. Operation begins and the unmarshaling code receives transmission of a transmission format element (block 1002). The unmarshaling code determines whether the object type has been received before (block 1008). If the object type has not been received before, the unmarshaling code obtains schema information from the transmission format element (block 1010).

Next, the unmarshaling code stores the schema information in a schema registry (block 1012) and converts the transmission format element into a data object based on the schema information in the schema registry (block 1014). Thereafter, operation ends.

If the object type has been received before, the unmarshaling code proceeds directly to block 1014 to convert the transmission format element into a data object based on the schema information in the schema registry. Thereafter, operation ends.

Thus, the present invention solves the disadvantages of the prior art by providing schema information with transmission of a data object. When a data object is converted to a transmission format, schema information for the data object is added to the transmission format element. The unmarshaling code uses the schema information for converting the transmission format element back to the data element. The unmarshaling code also uses the schema information to update a schema registry. As the unmarshaling code receives new data object types, the schema registry is built and the necessity for adding schema information to the transmission format elements decreases.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for transmitting a data object, the method comprising:
   marshaling a first data object into a first transmission format element, wherein the first data object is of a first type;
   adding schema information to the first transmission format element;
   sending the first transmission format element from a sender to a recipient;

receiving the first transmission format element at the recipient;

extracting the schema information from the first transmission format element;

unmarshaling the first transmission format element into the first data object at the recipient based on the schema information;

updating a schema registry at the recipient with the schema information, wherein the schema registry is composed of a plurality of schema registries, and wherein each of the plurality of schema registries correspond to a different scope;

marshaling a second data object into a second transmission format element; and responsive to the second data object being of the first type, sending the second transmission format element without the schema information.

2. The method of claim 1, wherein the data object complies with services data object framework.

3. The method of claim 1, wherein a format of the transmission format element is extensible markup language.

4. The method of claim 3, wherein marshaling the first data object into the first transmission format element includes:

retrieving the schema information from an extensible markup language schema registry at the sender; and serializing the first data object into extensible markup language according to the schema information.

5. The method of claim 1, wherein the first data object is of a first data type and wherein the schema information includes schema information for the first data type.

6. The method of claim 5, wherein the first data object belongs to a super schema and wherein the schema information further includes schema information for the super schema.

7. The method of claim 5, wherein the first data object has one or more properties and wherein the schema information further includes schema information for the one or more properties.

8. The method of claim 1, further comprising:

receiving the second transmission format element at the recipient; and unmarshaling the second transmission format element into the second data object at the recipient based on schema information in the schema registry.

* * * * *